United States Patent
Chen et al.

(10) Patent No.: US 8,595,260 B1
(45) Date of Patent: Nov. 26, 2013

(54) ALTERNATING BETWEEN DATA-DRIVEN AND METADATA-DRIVEN VIEW FOR DATAFLOW DESIGN

(75) Inventors: Yung-Yin Chen, Cupertino, CA (US); Wu Cao, Redwood City, CA (US)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/598,214

(22) Filed: Aug. 29, 2012

(51) Int. Cl.
*G06F 17/30* (2006.01)

(52) U.S. Cl.
USPC ............ 707/791; 707/802; 707/822; 707/828

(58) Field of Classification Search
USPC .................................................. 707/600–899
See application file for complete search history.

(56) References Cited

U.S. PATENT DOCUMENTS

2010/0275149 A1* 10/2010 Vuong et al. .................. 715/780

\* cited by examiner

*Primary Examiner* — Isaac M Woo
(74) *Attorney, Agent, or Firm* — Fountainhead Law Group PC

(57) ABSTRACT

A dataflow design tool allows users to provide data mappings from source database tables to a target database table. The tool provides metadata-driven views of the database tables and data-driven views of the database tables. Views of the database tables may be flipped between the metadata driven format and the data-driven format.

20 Claims, 13 Drawing Sheets

ALTERNATING BETWEEN DATA-DRIVEN AND METADATA-DRIVEN VIEW FOR DATAFLOW DESIGN

BACKGROUND

Unless otherwise indicated herein, the approaches described in this section are not prior art to the claims in this application and are not admitted to be prior art by inclusion in this section.

Extract, transform, and load (ETL) processing is an ongoing effort in any large enterprise information system, in which data stored in database tables are moved from one location (one or more source database tables) to another location (target database table). A well-executed ETL job begins with a good understanding of the data being moved about and a good dataflow design for extracting the data and transforming the data so that it winds up in the target database table in a meaningful and useful way. Typical ETL design tools use metadata-driven views of the data that are being moved. Accordingly, ETL designers are familiar with viewing the data to be moved in terms of the metadata that describe the data. Users of the data, however, may not feel as comfortable viewing their data in terms of the underlying metadata. Viewing the actual data that is stored in the database table versus the metadata that characterize the actual data is more intuitive for the user, and for ETL designer may enhance the traditional metadata view that they are accustomed to.

DETAILED DESCRIPTION

Disclosed embodiments relate to a tool that allows for manipulations to be made to database tables (e.g., during ETL dataflow design) in terms of the metadata and, in the alternative, in terms of the actual data that is stored in the database tables. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
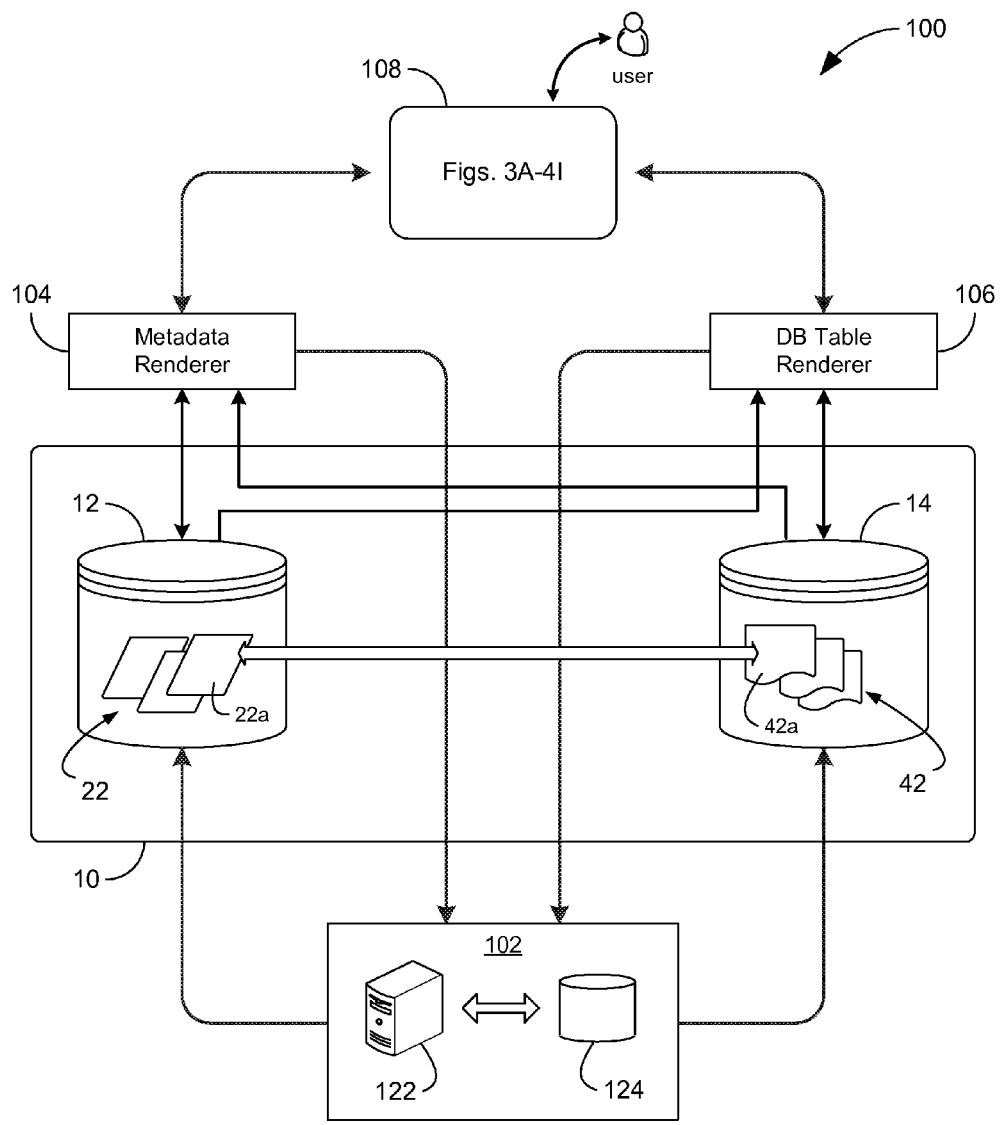
FIGS. 1 and 1A illustrate high level block diagrams of a system according to the present disclosure.
Figure 1A:
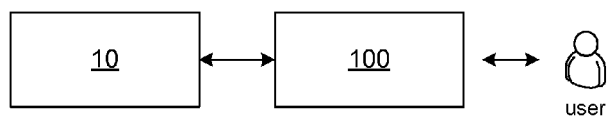

FIGS. 1 and 1A illustrate a system 100 in accordance with embodiments of the present disclosure. The system 100 may comprise a computing engine 102 that is in data communication with a database system 10, a metadata renderer 104, a database table renderer 106, and a user interface (UI) 108 that allows a user to interact with the system 100.

The database system 10 may include a metadata data store 12 to store metadata 22, and a database table data store 14 to store the database tables 42. The data stores 12, 14 are logical representations and may or may not reflect how the metadata 22 and the database tables 42 are physically stored in the database system 10. For a given database table 42a, there is corresponding metadata 22a that characterize the database table and the data that is stored in the database table.

A common definition for metadata is that metadata is "data about data." For example, suppose the database table 42a stores three pieces of data: a name, a sales amount, and a date of sale. The "metadata" that is associated with database table 42a may comprise data (information) that characterize the data that is stored in the database table 42a. For example, metadata might describe the data type of the data; e.g., the name is a TEXT data type, the sales amount is an integer (or a floating point number) data type, and the date of sale is a date (time) data type. Metadata may characterize the data in other ways, such as data length (e.g., the name has maximum of 20 characters), display format (e.g., date of sale is displayed as MM/YYY), and so on. Metadata may characterize the data in terms of the origins of the data. For example, a column of data in database table 42a may come from a database table A, or may be a combination of columns from different database tables, or is computed from two or more columns in a database table B, and so on. Metadata may characterize the database table itself, such as where its physical files are located in a file system, the number of columns in the database table, then column names, the number of records in the database table, access permissions, and so on.

Continuing with FIG. 1, the computing engine 102 may include a computer system 122 and a data store 124. The data store 124 may comprise non-volatile computer readable media such as magnetic storage and/or optical storage. Executable program code may be stored on the data store 124 and executed by the computer system 122 to cause the computer system to perform various functions, methods, and steps described herein below. The computing engine 102 may communicate directly with the metadata data store 12 and the database table data store 14 components of the database system 10 to write data into the data stores.

The metadata renderer 104 and database table renderer 106 may generate views in the UI 108. More specifically, the metadata renderer 104 may generate a view of the metadata 22a, which characterize data that is stored in a given database table 42a. Likewise, the database table renderer 106 may generate a view of the data that is stored in the given database table 42a. The renderers 104, 106 may be connected to the metadata data store 12 and the database table data store 14 components of the database system 10 to read out data for display in the UI 108. In some embodiments, the computing engine 102 may implement the metadata renderer 104 and the database table renderer 106.

The metadata renderer 104 may receive input from the user (user input) to manipulate the metadata 22a that is displayed in the UI 108. Likewise, the database table renderer 106 may receive input from the user to manipulate data comprising the database table that is displayed in the UI 108. The user input may include input from a mouse device, a keyboard, a touch sensitive display, and so on. The computing engine 102 may receive commands from the renderers 104, 106 that correspond to the user input. The computing engine 102, in turn, may update the metadata data store 12 and the database table data store 14 to reflect changes to the database table 42a in accordance with the user input.

In accordance with principles set forth in the present disclosure, the UI 108 may display a given database table in one of two formats. One format represents the actual data that is stored in the database table. This format may be referred to as a "data-driven" format. This format may be tabular to represent the logical structure of the database table. Another format represents the metadata that characterize the data that is stored in database table. This may be referred to as a "metadata-driven" format. In some embodiments, the user may selectively invoke the database table renderer 106 to display a view of the database table using the data-driven format, or the user may invoke the metadata renderer 104 to display a view of the database table using the metadata-driven format. The UI 108 may allow the user to "flip" the format of the displayed view between the data-driven format and the metadata-driven format.

Figure 2:
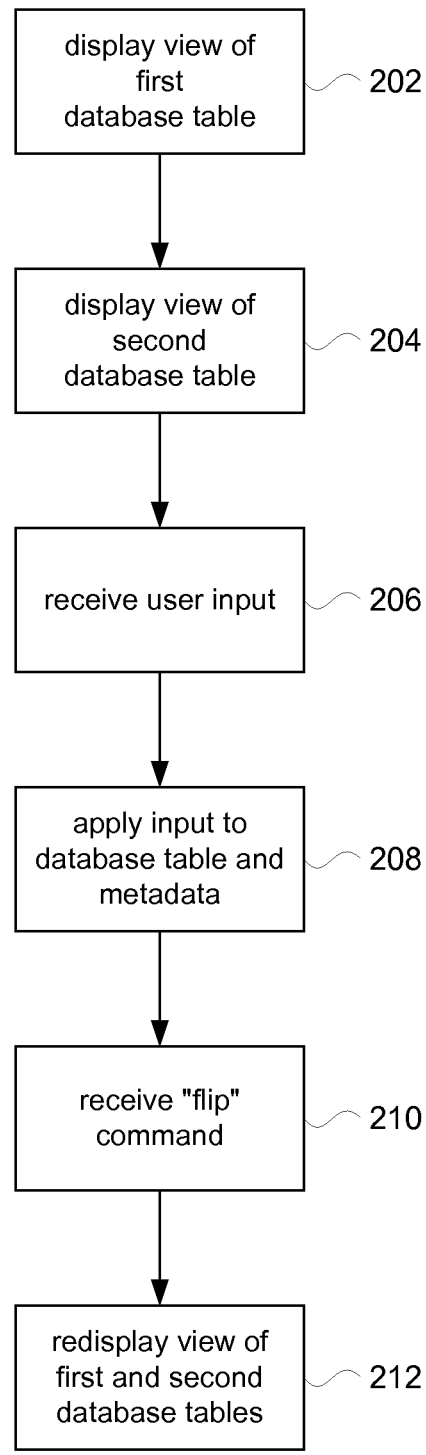
FIG. 2 shows a high level workflow according to the present disclosure.

A workflow for data processing and display generation in the system 100 is illustrated in FIG. 2. In some embodiments, the workflow may include selecting a source database table and a target database table. When a user has identified a source database table, a view of the source database table may be generated at 202, for example by the metadata renderer 104 or the database table renderer 106. The format of the view, whether data-driven or metadata-driven, may be selected by the user. When the user has identified a target database table, a view of the target database table may be generated at 204. If the target database table does not exist, the system 100 may create an empty database table. In some embodiments, the format of the view of the target database table may be the same as for the source database table. In other embodiments, the user may view each database table using a different format. For example, the source database table may be viewed using the data-driven view while the target database table is viewed using the metadata driven view.

At 206, the user may provide input (user input) to select and manipulate data elements comprising the views. In some embodiments, the user input may specify a "mapping" of data elements from the source database table to the target database table. The mapping may identify a correspondence between columns in the target database table and columns in the source database table. The mapping may include operations (transformations) that were performed on the source columns to produce the target columns. In addition to specifying mappings between source and target database tables, the user input may specify operations to be performed on selected data elements in the target database table. These aspects of the present disclosure will be discussed in more detail below.

At 208, the renderer 104, 106 may issue commands to the computing engine 102 that correspond to action(s) indicated by the user input. The computing engine 102 may generate corresponding database queries or commands that can be issued to the database system 10. Depending on the actions to be performed, the computing engine 102 may communicate directly with the metadata data store 12 and/or the database table data store 14 to make changes respectively to the metadata of the target database table and/or the target database table itself.

In accordance with the present disclosure, the user may flip (210) the database table views between the data-driven format and the meta-data driven format. In some embodiments, for example, the source and target database table views may be displayed in the same format and flipped between the data-driven format and the metadata-driven format. In other embodiments, the source database table and the target database table may be viewed using different formats. The view of the source database table may be flipped from one format to the other independently of the format used to generate the view of the target database table. The UI 108 may be updated to redisplay (212) the view of either or both the source and target database tables, as the formats of the views change. This may include the renderers 104, 106 accessing the metadata data store 12 and the database table data store 14 to obtain current states of the data stored in the data stores, thus taking into account any changes that the computing engine 102 may have made (208) to the database tables.

Figure 3A:
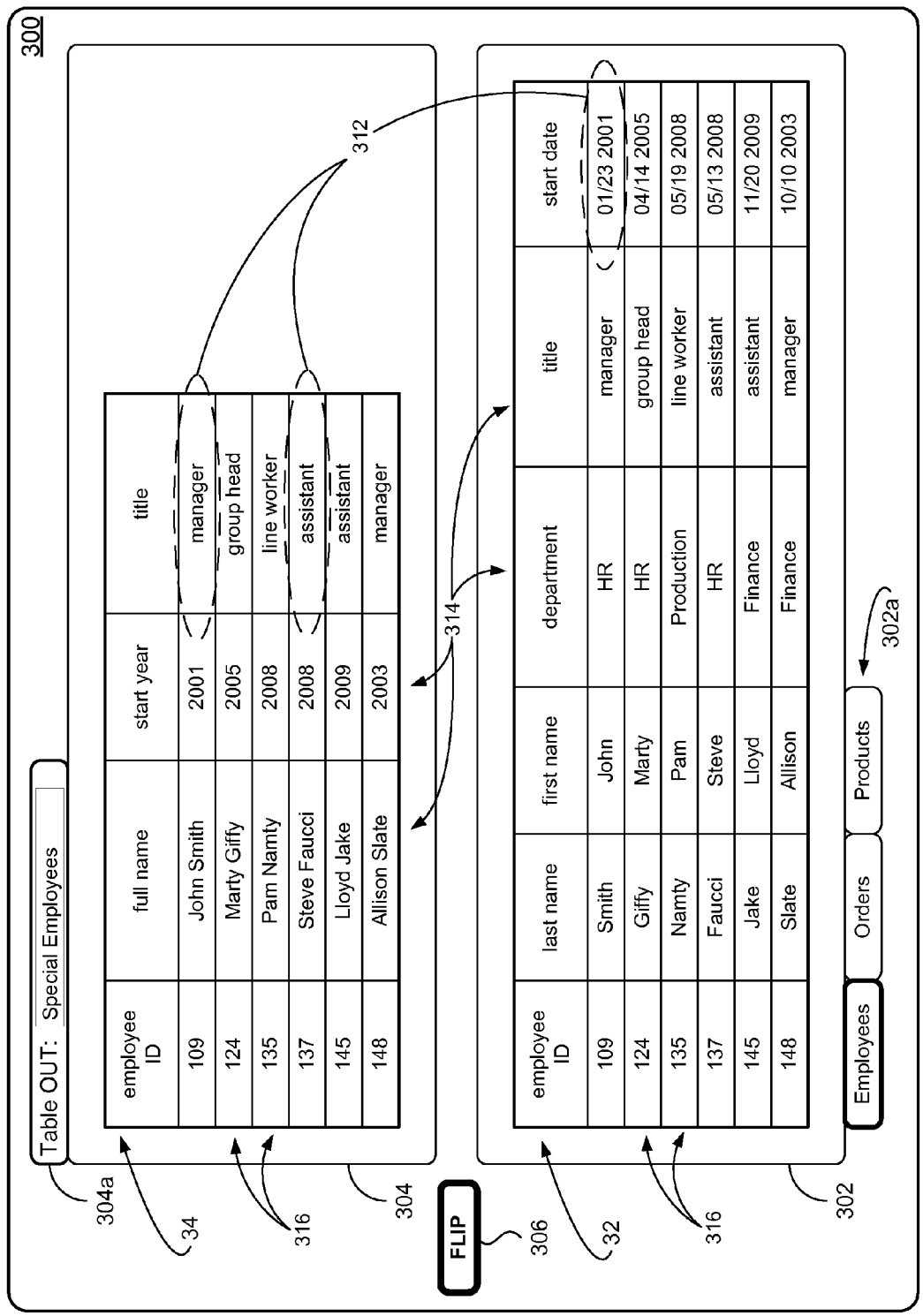
FIG. 3A illustrates an example of data-driven views of database tables.

Some examples of UI 108 will now be described to further illustrate aspects of the present disclosure. Referring to FIG. 3A, the UI 108 may generate a display 300 on any suitable display device, including a computer monitor of a desktop computer, a laptop computer monitor, a touchscreen device of a computer tablet, and so on. The user may interact with the display 300 using suitable input devices, including a mouse device (point and click), a keyboard, a touchscreen device (swipe, tap, and other gestures). Knowledge of various graphical elements and interactions in a windows-based interface is assumed such as scrollbars, drop down menus, selection of individual or groups of items, and so on.

FIG. 3A shows a view 302 of a source database table 32, called Employees. A set of tabs 302a may provide a list of source database tables that a user may select from. The Employees tab is shown selected. The view 302 of source database table 32 is formatted using a data-driven format, wherein data that is stored in the source database table is displayed; for example, in a tabular format that represents the logical structure of the source database table. In other embodiments, formats other than a tabular format may be used. The source database table 32 may comprise more data than can be displayed in view 302. Accordingly, although not shown, windowing tools such as scroll bars may be provided to allow the user to scroll vertically (to access additional rows) and horizontally (to access additional columns).

A view 304 displays a target database table 34, called Special Employees. An input box 304a allows the user to specify the target database table 34. The view 304 of target database table 34 may be formatted using the data-driven format. If the selected target database table already exists, then the view 304 may show data from the already existing target database table. If the selected target database table does not exist, the system 100 may create an empty database table, and the view 304 may display some indication that the selected target database table is newly created and empty.

The views 302, 304 of respective database tables 32, 34 may comprise "data elements", which can be selected by the user and manipulated; e.g., moved, operated on, and other such similar operations. For example, each cell 312 among the database tables 32, 34 may be a data element that the user may manipulate in some way. Each column 314 may be a data element, each row 316, and so on.

A "flip" button 306 may be provided in accordance with the present disclosure. The user may activate the button 306 (e.g., by "clicking" on it) to flip the display on the UI 108 to present a display 301 (FIG. 3B) of metadata-driven views of database tables 32, 34. Activating the button 306 from the display 301 may flip the display on the UI 108 back to display 300.

Figure 3B:
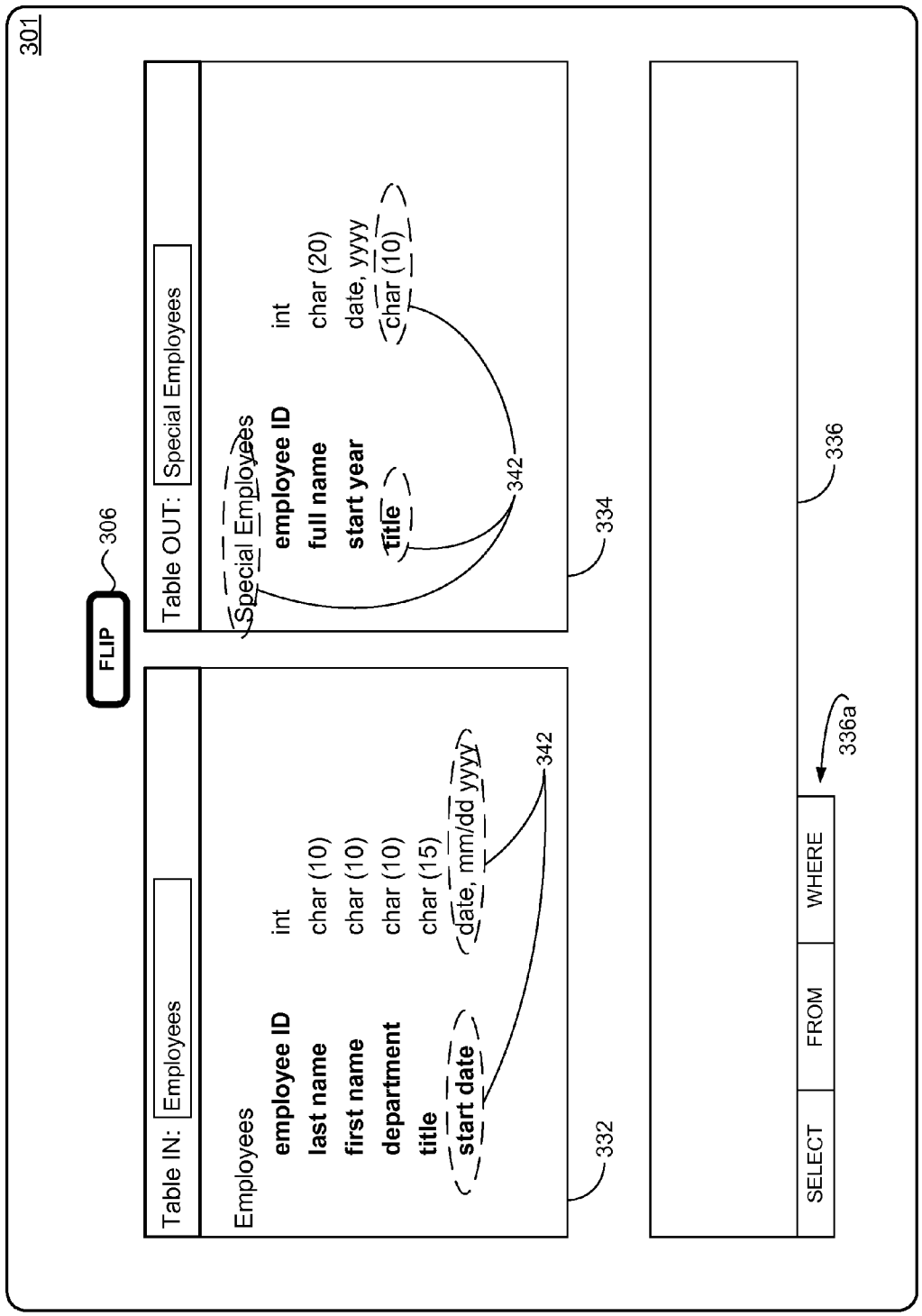
FIG. 3B illustrates an example of metadata-driven views of database tables.

Referring to FIG. 3B, the display 301 shows views 332, 334 of respective source database table 32 and target database table 34. The views 332 and 334 are displayed using the metadata-driven format, where the metadata characterizing data that are stored in the database tables are displayed, rather than the data itself. Thus, for example, the view 332 of source database table 32 (Employees) does not show the employee ID numbers, or the names, or the start dates, and so on that are stored in the source database table. Rather, the view 332 displays information (metadata) that describe the data that are stored in the source database table 32. For example, the metadata in view 332 shows that employee ID data are an integer data type, the last name data are ten characters in length, and so on. The names of the data fields (e.g., employee ID, last name, first name) are metadata. The order in which the data field names appear in the view 332 may constitute metadata in that the order of the data field names in view 332 reflects the order of the columns in the source database table 32.

Likewise, the view 334 of target database table 34 (Special Employees) does not show the employee ID numbers, or the full names, or the start years, and so on that are stored in the target database table. Rather, the view 332 comprises information (metadata) that describes the data that are stored in the target database table 34.

In some embodiments, the data elements 342 may be selected by the user and manipulated; e.g., moved, operated on, and other similar operations. For example, the user may select the data element title, which is the name of a column in the target database table, and type over it to rename the column. The display 301 shows an input area 336 for receiving user input to perform operations on data elements 342 selected from the views 332, 334. A set of tabs 336a may provide some predefined operations for the user to select from.

The "flip" button 306 provided in display 301 may be activated (e.g., by "clicking" on it) to cause the UI 108 to change its display and present the display 300 (FIG. 3B).

Figure 4A:
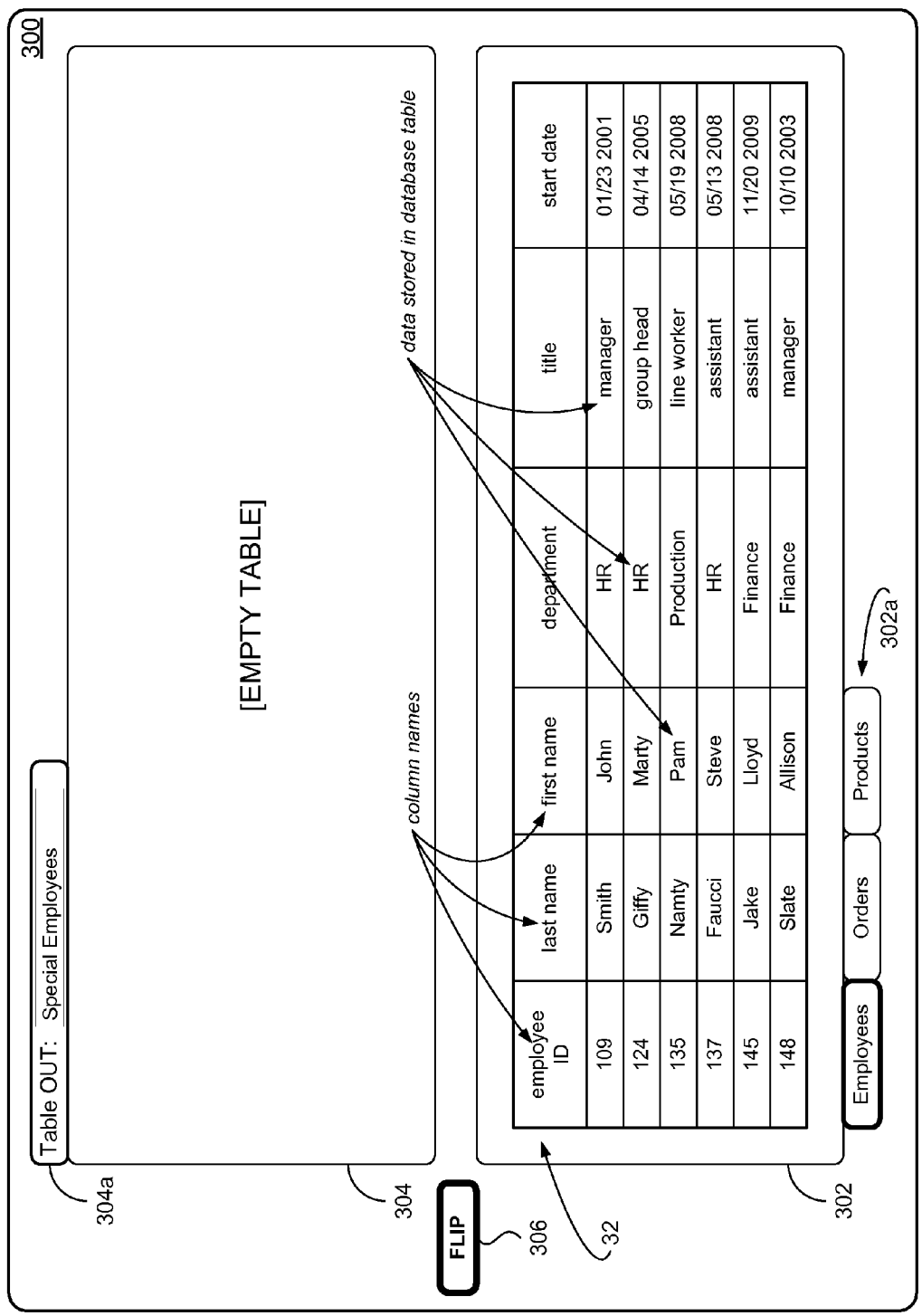
FIGS. 4A and 4B are data-driven and metadata-driven views, respectively, of a source database table.

A sequence will now be described, beginning with FIG. 4A, to illustrate some user interactions that highlight aspects of the present disclosure. FIG. 4A shows a user having selected a source database table 32 and a target database table 34. It can be assumed, without loss of generality, that the target database table is newly created. The display 300 shows a data-driven view 302 of the selected source database table 32, and a data-driven view 304 of the newly created target database table, which is empty. The view 302 displays data that is stored in the source database table 32 in a tabular format comprising columns and rows. The column names of each column (e.g., employee ID, last name) may be obtained from the metadata (in metadata data store 12, FIG. 1) that correspond to the source database table 32, and the data may be obtained from the database table data store 14.

Figure 4B:
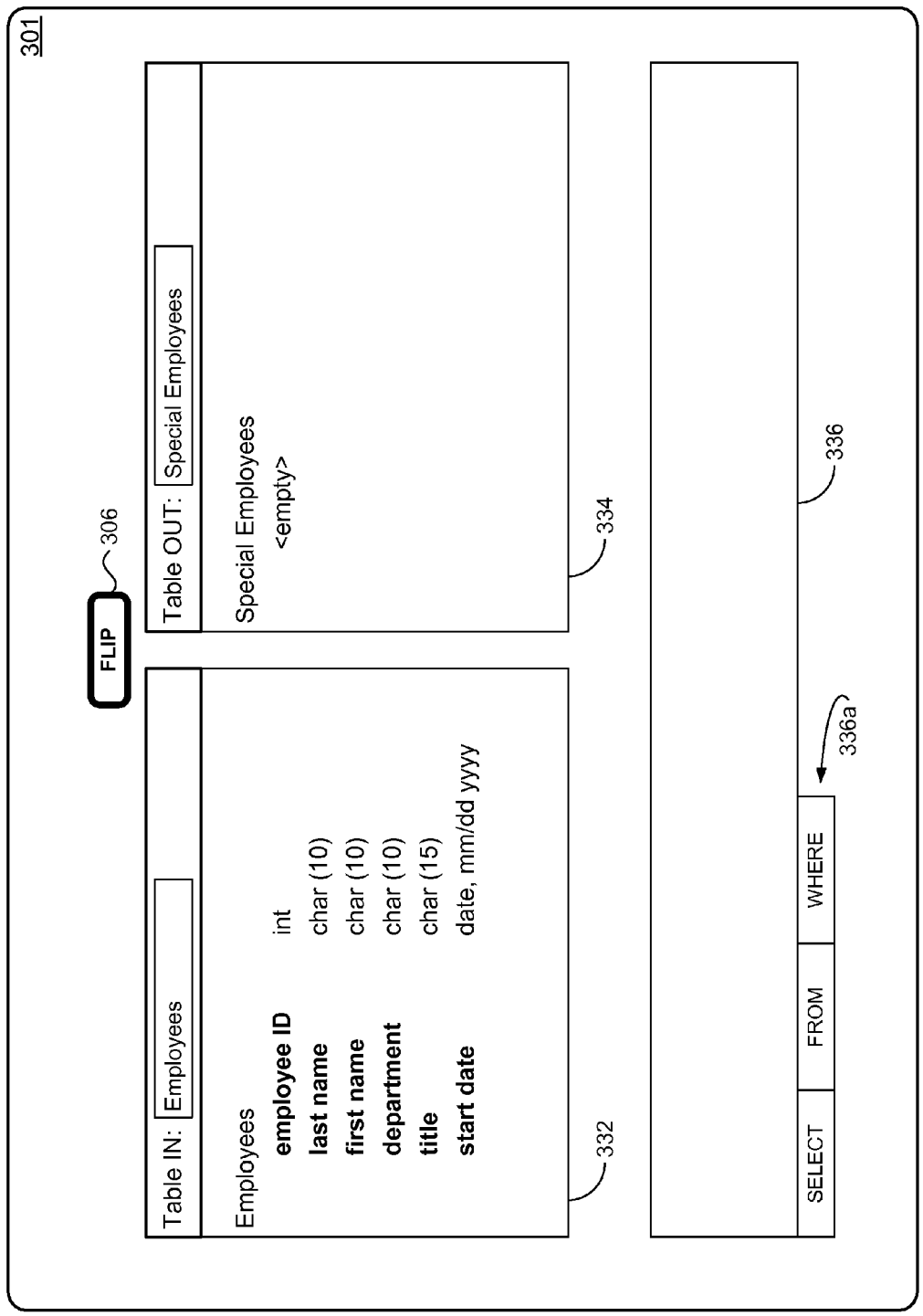

If the user clicks on button 306, the UI 108 will be redisplayed and present the display 301 shown in FIG. 4B, where the database tables 32, 34 are viewed using the metadata-driven format. Thus, referring FIG. 4B, the view 332 of source database table 32 displays information (metadata) about each column of data, but not the data itself. For example, the employee ID column contains integer data, the last name column contains character data (ten characters long), and so on. The view 334 of the newly created target database table 34 is empty. The user may return to the data-driven views of display 300 by clicking the button 306.

Figure 4C:
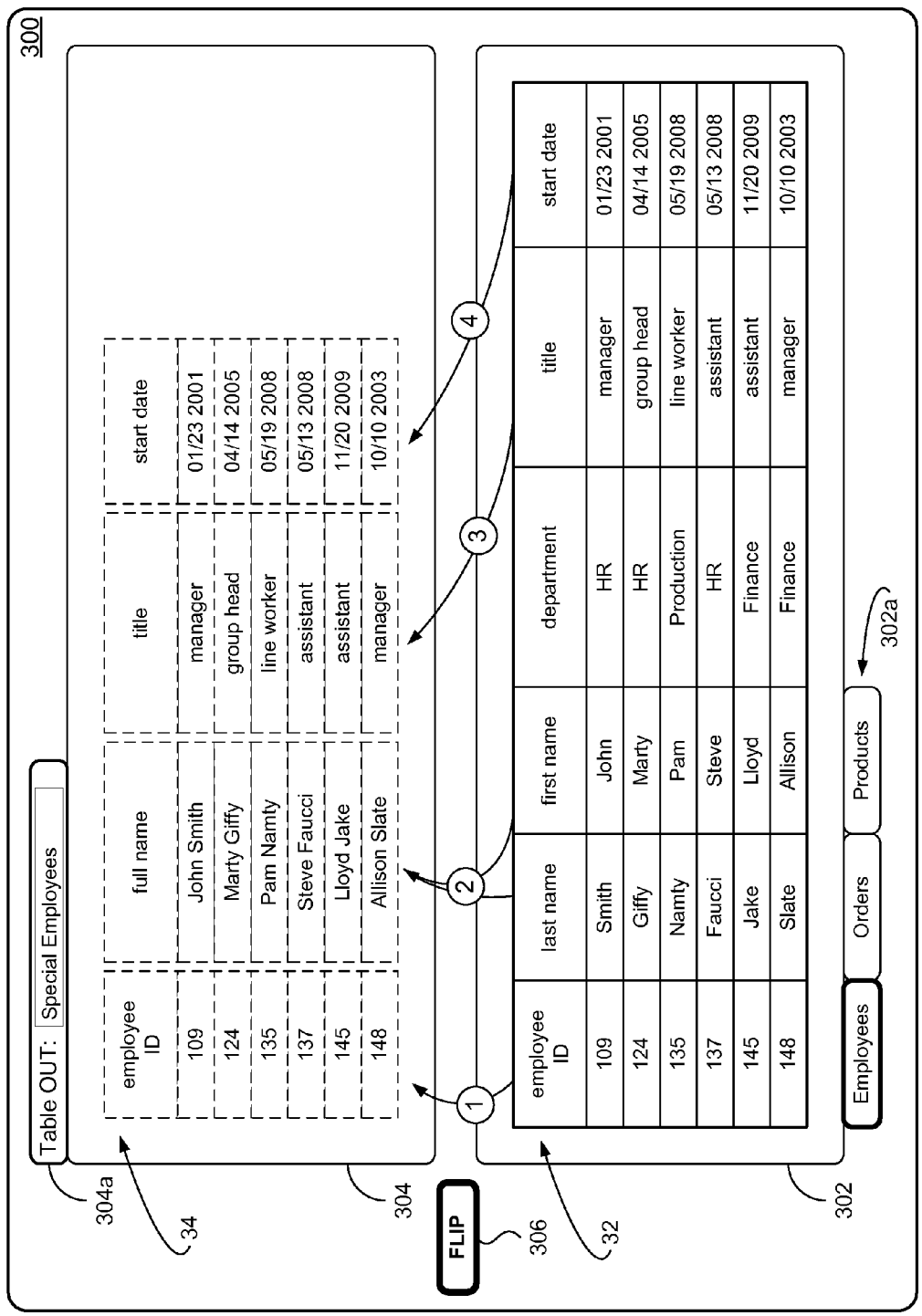
FIGS. 4C and 4D illustrate making changes in the data-driven view, and then flipping to the metadata-driven view to see the corresponding changes in the metadata-driven view.

Referring to FIG. 4C, the figure shows a series of user inputs, identified by circles 1, 2, 3, and 4. For example, circle 1 represents user input in which the column employee ID (data element) from source database table 32 was selected, dragged, and dropped into view 304 of the target database table 34, thus creating a new column in the view. In some embodiments, the database table renderer 106 may receive the user input and, in response, provide animation or other visual feedback to the user that represents the user's actions; e.g., highlighting the selected column in the source database table 32, animating the movement of the column as it is dragged from view 302 into view 304, creating an image of the new column in view 304, and so on.

In accordance with principles of the present disclosure, the database table renderer 106 may send one or more commands to the computing engine 102 that correspond to the actions of the user input. The computing engine 102 may then communicate with the metadata data store 12 and the database table data store 14 to make the changes indicated by the user input. The computing engine 102 may store a "mapping expression" in the metadata for the target database table 34. The mapping expression may comprise the operation(s) that were performed to produce the change in the target database table 34. For example, in the case of user input 1, the mapping expression may be a SELECT statement used to copy the employee ID column from the source database table 32 in the target database table 34.

The database table renderer 106 may access the database table data store 14 to read out data from the target database table 34 as it is being loaded. The data may then be displayed in the view 304 of the target database table 34. In a "live" system, the source database table 32 may many thousands of records. In some embodiments, therefore, only a subset of the data that is stored in the source database table 32 may be loaded into the target database table 34; enough that the user can see the effects of their actions in real time without having to run an entire data load from the source database table. In some embodiments, certain data fields may need to be grayed out or otherwise made unreadable in order to protect sensitive information (e.g., social security numbers, medical conditions, and other such information). Some data fields may be "protected" so that they cannot be modified when being mapped into the target database table (e.g., employee salaries may be "read only"), and so on.

Circle 2 represents user input wherein the last name and first name columns are used to create a new column called full name and dropped into view 304. For example, the user may select the last name and first name columns in the source database table 32. The user may then specify an operation (e.g., via drop down menu, or by typing into an input area) to concatenate the two columns into one column. The user may specify the name of the new column; i.e., full name.

This series of user inputs may generate a corresponding series of commands that are sent to the computing engine 102. The data stores 12, 14 may then be updated to reflect the changes made by the user. For example, a column called full name may be created in the target database table 34. The newly created column may be populated by performing a concatenation operation on the first name and last name columns in the source database table 32, using actual data that is stored in the source database table 32. The computing engine 102 may produce a mapping expression that represents this series of actions (e.g., a concatenation operation), and store it with the metadata for the target database table 34.

Figure 4D:
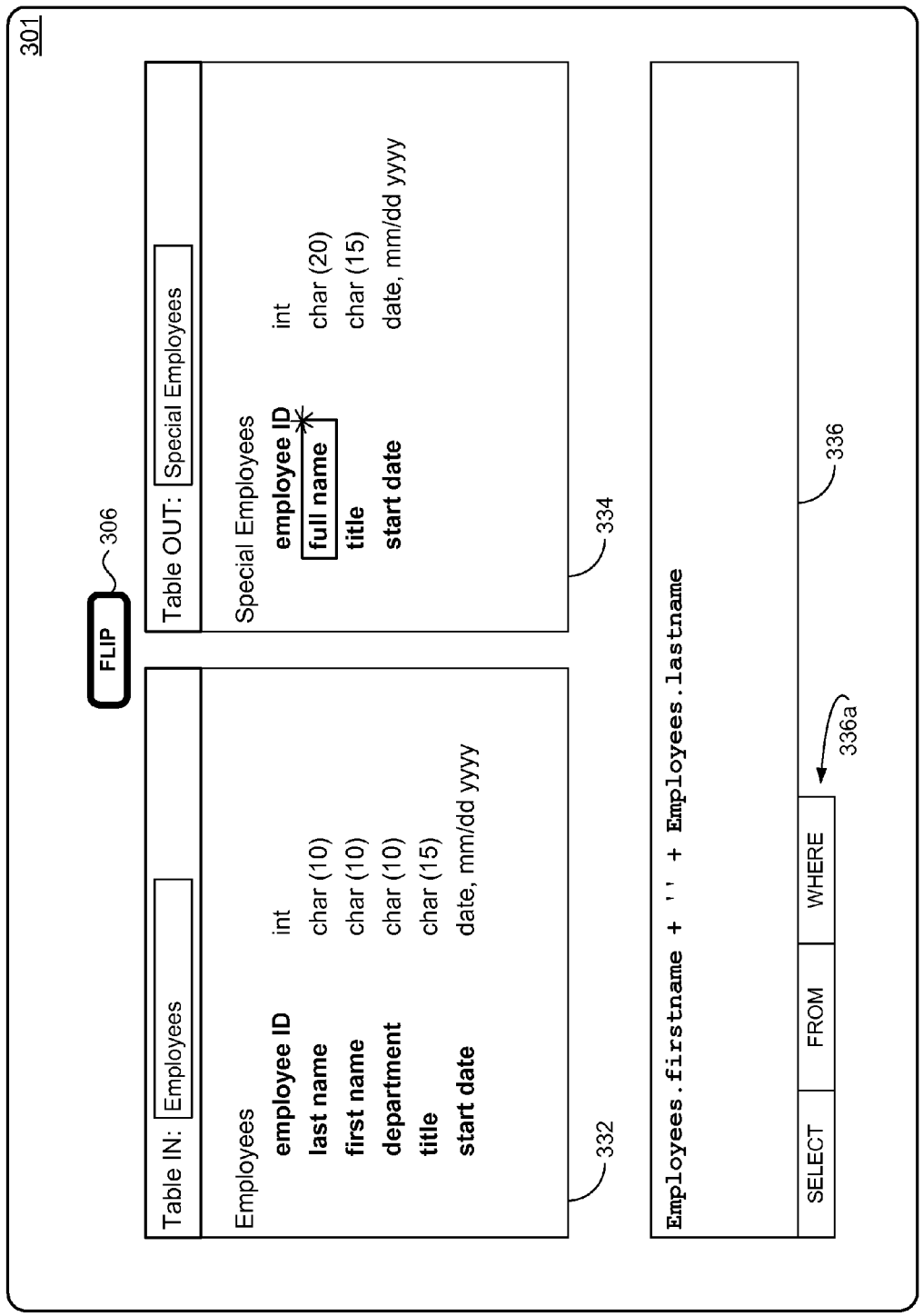

Circles 3 and 4 represent user inputs to drag and drop of respective columns title and start date from view 302 into view 304. The user may then click on button 306 to view the source and target database tables 32, 34 using the metadata-driven format. Referring to FIG. 4D, the metadata in view 334 of the target database table 34 now shows some metadata, resulting from changes that were made per user inputs 1, 2, 3, and 4 in the data-driven views of display 300 shown in FIG. 4C.

FIG. 4D illustrates a further aspect of the present disclosure. The figures shows that the user has selected the data element full name metadata in view 334 (e.g., by clicking on full name or tapping on full name). In accordance with the present disclosure, the metadata renderer 104 may access the metadata data store 12 to access mapping expression that may correspond to the selected data element. In this example, there is a mapping expression and so the metadata renderer 104 may display the mapping expression in the input area 336, showing how the full name column in the target database table 34 was created.

Figure 4E:
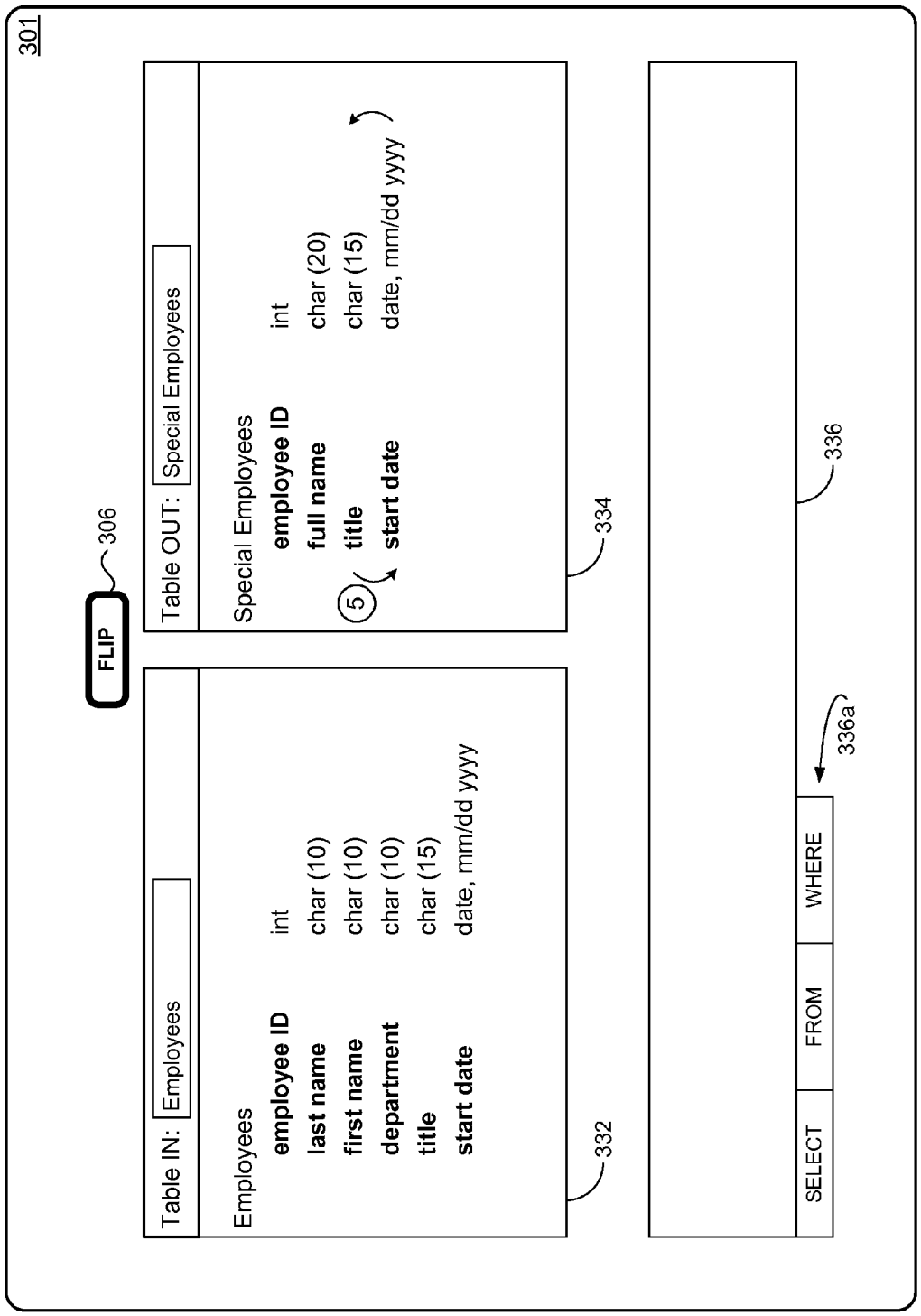
FIGS. 4E, 4F, and 4G illustrate making further changes in the metadata-driven view (FIGS. 4E and 4F), and then flipping to the data-driven view (FIG. 4G) to see the corresponding changes in the data-driven view.
Figure 4F:
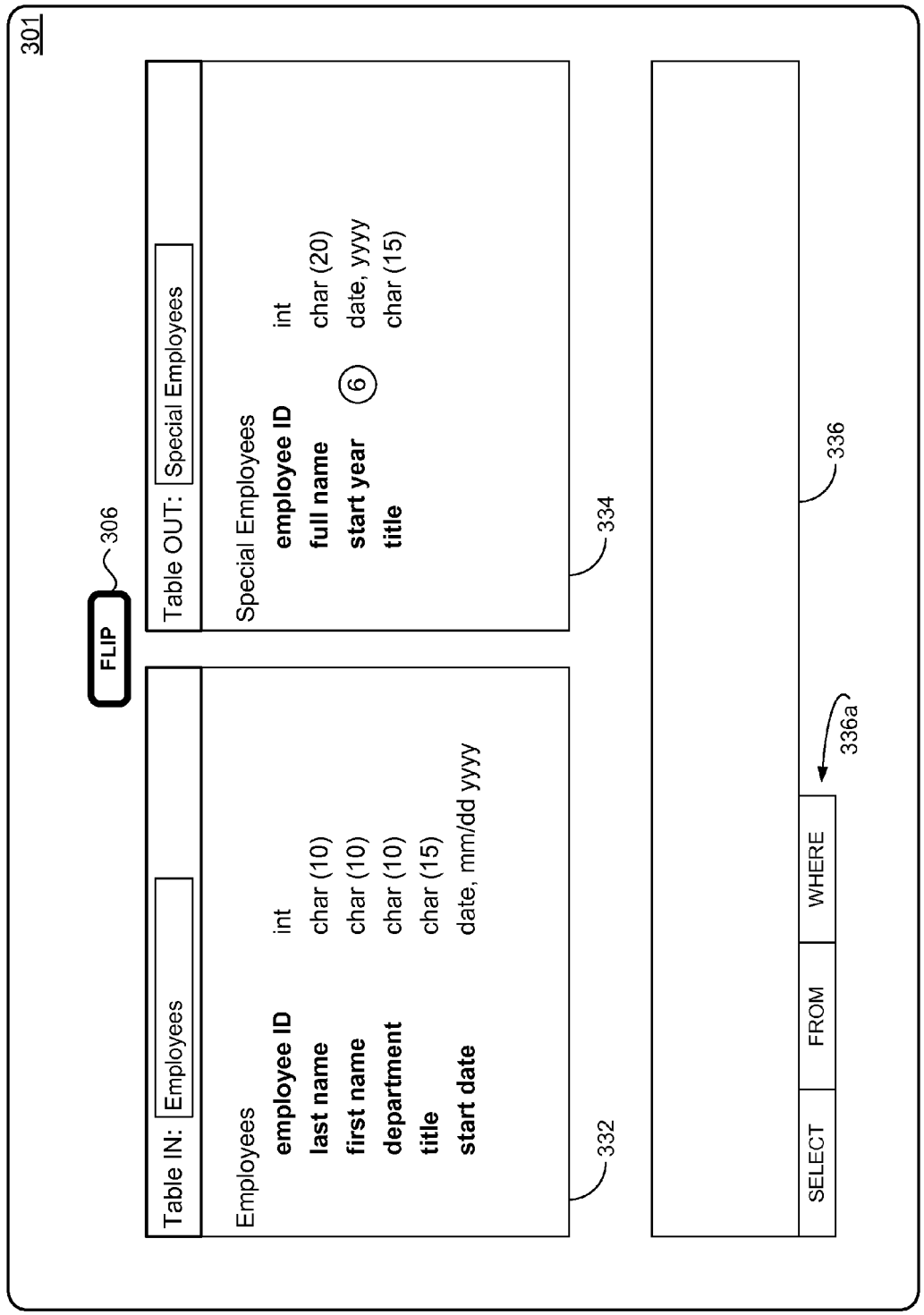

Refer now to FIGS. 4E and 4F. In FIG. 4E, circle 5 represents additional user input received in the metadata views presented in display 301. The user input 5 shows the user swapping the title and start date metadata in the view 334. For example, the user may click on the data element title and drag it down by one row, or the user may click on the data element start date and drag it up one row. The metadata renderer 104 may send commands to the computing engine 102 update the metadata data store 12 and the database table data store 14 to change the columns in the target database table according to the user input 5. FIG. 4F shows the result of the swap in the metadata driven views 332, 334 presented in display 301.

FIG. 4F shows circle 6, which represents additional user input. In particular, the user has changed the name of the column from start date to start year, and has changed the format of the column to represent only the "year". The metadata renderer 104 may send commands to the computing engine 102 update the metadata data store 12 and the database table data store 14 according to the user input 6. The metadata renderer 104 may update the view 334 to show the new column name, namely start year, and the new format, namely date, yyyy. When the user clicks on button 306, the UI 108 will be redisplayed to present the display 300 shown in FIG. 4G. The figure shows that the target database table 34 has been updated in accordance with changes made in the metadata driven view 334 in FIG. 4F.

Figure 4G:
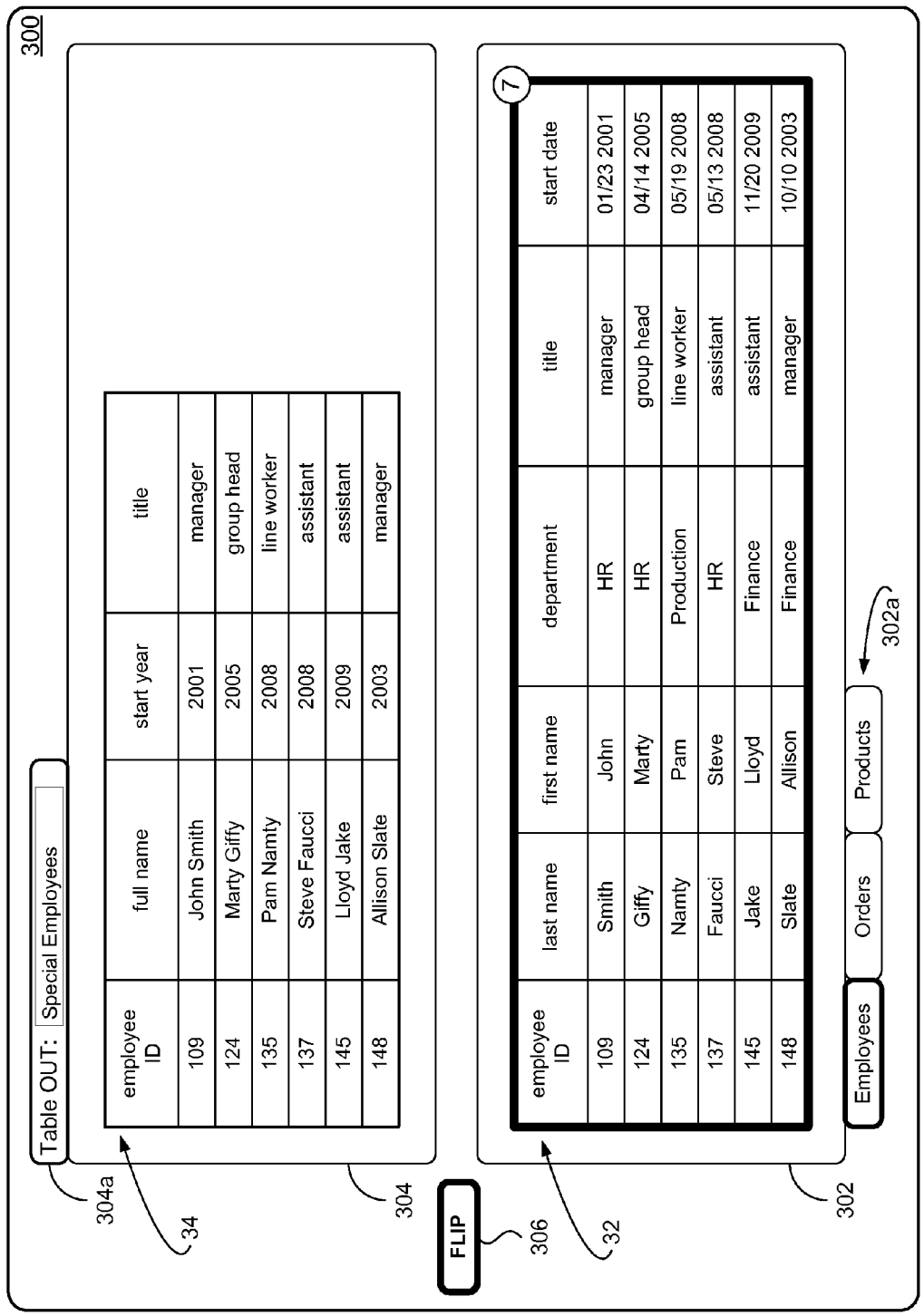
Figure 4H:
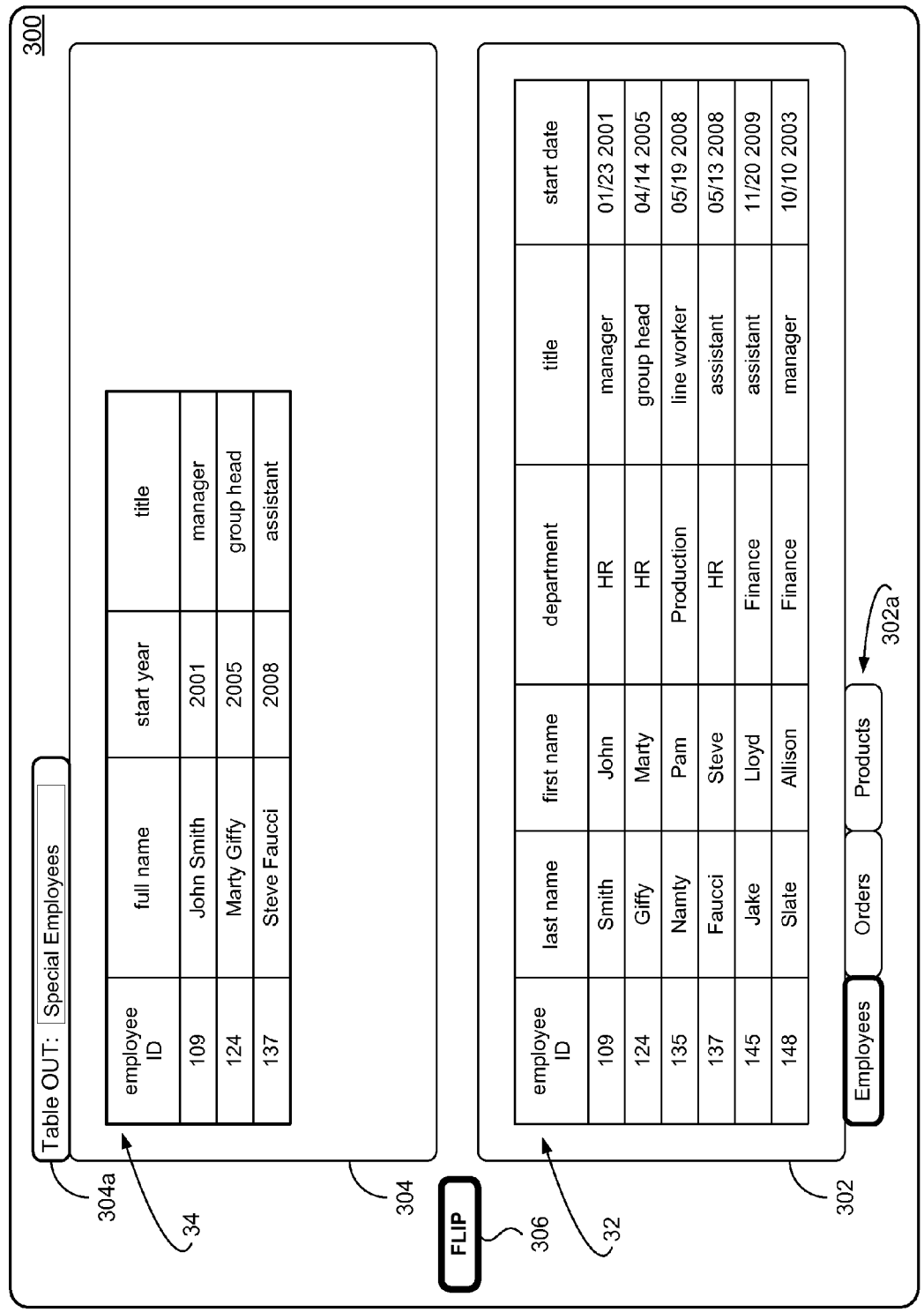
FIG. 4H illustrates the result of using a filter.

FIG. 4G shows circle 7, which represents user input wherein the user has selected the source database table 32 and has specified an operation on the table (e.g., via a drop down menu not shown). For example, the user may apply a filter operation to select certain rows from the source database table 32 to be loaded into the target database table 34. For example, the user may select out employees who are in the HR department. The resulting data-driven view 304 of the target database table 34 may be as shown in display 300 of FIG. 4H.

Figure 4I:
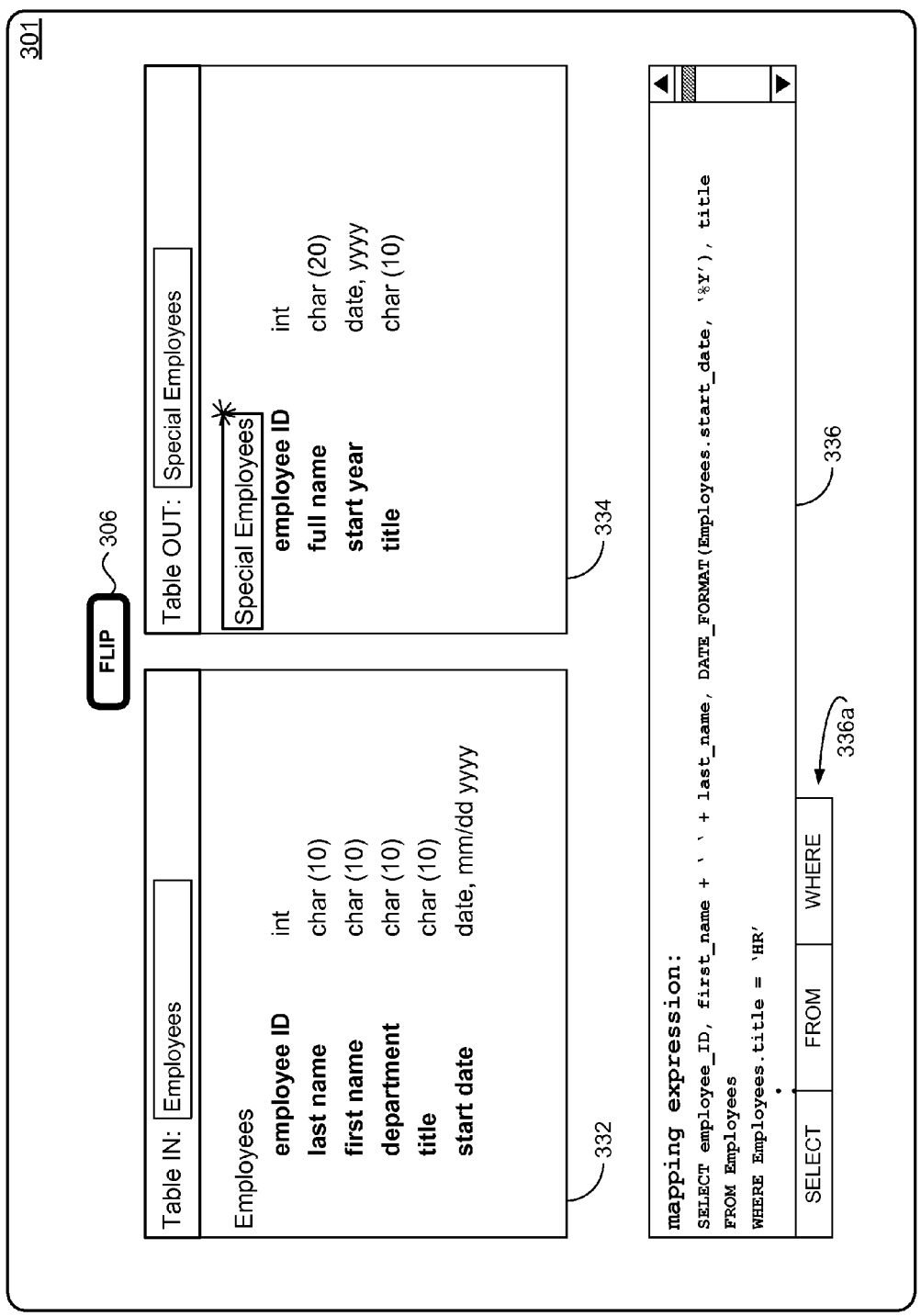
FIG. 4I shows flipping from the data-driven view in FIG. 4H to the metadata-driven view of FIG. 4I, and exposing a mapping expression in the metadata-driven view representative of the filter in FIG. 4H.

The user may click on button 306 to display the corresponding metadata-driven view of the target database table 34 in FIG. 4I. If the user selects the name of the target database table 34 in the view 334 (as illustrated in the figure), the input area 336 may display properties of the target database table, including for example a mapping expression of the filter that was applied to the source database table 32. Thus, for example, a SELECT statement that represents the filter may be presented in input area 336. It will be appreciated that the user may modify this statement, and if the user then clicks on the button 306, the modifications may be reflected in the data-driven view 304 of the target database table 34. Input area 336 may include a scrollbar to access any additional descriptive information about the target database table 34 shown in view 334.

As illustrated by the sequence shown in FIGS. 4A-4I, embodiments of the present disclosure allow users to design their dataflow based on a subset (sample) of the data stored in their source database tables with real-time data updates made in the target database table, and to flip between the data-driven view and the metadata-driven view. The data-driven view allows users to view the effects of their designs in terms of the actual data, and thus may be more intuitive.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method in a database system comprising operating a computer system to perform steps of:
   displaying a first view of a first database table using a current format that is either a first format to display data that is stored in the first database table, or a second format to display metadata that characterize the data that is stored in the first database table;
   displaying a second view of a second database table using a format same as the current format of the first view;
   applying data elements from the first view to the second view;
   changing data in the second database table according to how the data elements from the first view are applied to the second view;
   redisplaying the second view to reflect changes made to the second database table;
   receiving user input; and
   in response to receiving the user input, redisplaying the first view and the second view using a format, either the first format or the second format, that is different from the current format.

2. The method of claim 1 wherein the first format represents data that is stored in a database table in tabular form.

3. The method of claim 1 wherein the current format of the first view and the second view is the first format, which displays data that is respectively stored in the first database table and the second database table, wherein redisplaying the first view and the second view includes displaying the first view and the second view using the second format, which represents metadata that characterize the data that is respectively stored in the first database table and the second database table.

4. The method of claim 1 wherein the current format of the first view and the second view is the second format, which displays metadata that characterize data that is respectively stored in the first database table and the second database table, wherein redisplaying the first view and the second view includes displaying the first view and the second view using the first format, which displays data that is respectively stored in the first database table and the second database table.

5. The method of claim 1 further comprising, prior to the step of applying, receiving user input that specifies the data elements comprising the first view and receiving user input that specifies operations to be performed on the data elements.

6. The method of claim 5 wherein the first view and the second view are displayed using the first format, wherein the data elements correspond to data that is stored in the first database table, wherein the operations are performed on the data that is stored in the first database table and results of the operations are stored in the second database table.

7. The method of claim 5 wherein the first view and the second view are displayed using the second format, wherein the data elements correspond to metadata that characterize the data that is stored in the first database table, wherein the operations are performed on the metadata and results of the operations are stored among metadata that characterize data stored in the second database table.

8. The method of claim 1 wherein displaying a first view of a first database includes displaying only a subset of the data that is stored in the first database.

9. A database system comprising:
a computer system; and
a data storage device having stored thereon executable program code, which, when executed by the computer system, causes the computer system to:
   display a first view of a first database table using a current format that is either a first format to display data that is stored in the first database table, or a second format to display metadata that characterize the data that is stored in the first database table;
   display a second view of a second database table using a format same as the current format of the first view;
   apply data elements from the first view to the second view;
   change data in the second database table according to how the data elements from the first view are applied to the second view;
   redisplay the second view to reflect changes made to the second database table;
   receive user input; and
   in response to the user input, redisplay the first view and the second view using a format, either the first format or the second format, that is different from the current format.

10. The database system of claim 9 wherein the first format represents data that is stored in a database table in tabular form.

11. The database system of claim 9 wherein the current format of the first view and the second view is the first format, which displays data that is respectively stored in the first database table and the second database table, wherein redisplaying the first view and the second view includes displaying the first view and the second view using the second format, which represents metadata that characterize the data that is respectively stored in the first database table and the second database table.

12. The database system of claim 9 wherein the current format of the first view and the second view is the second format, which displays metadata that characterize data that is respectively stored in the first database table and the second database table, wherein redisplaying the first view and the second view includes displaying the first view and the second view using the first format, which displays data that is respectively stored in the first database table and the second database table.

13. The database system of claim 9 wherein the executable program code further causes the computer system to receive user input that specifies the data elements comprising the first view and receiving user input that specifies operations to be performed on the data elements.

14. The database system of claim 13 wherein the first view and the second view are displayed using the first format, wherein the data elements correspond to data that is stored in the first database table, wherein the operations are performed on the data that is stored in the first database table and results of the operations are stored in the second database table.

15. The database system of claim 13 wherein the first view and the second view are displayed using the second format, wherein the data elements correspond to metadata that characterize the data that is stored in the first database table, wherein the operations are performed on the metadata and results of the operations are stored among metadata that characterize data stored in the second database table.

16. A non-transitory computer readable storage medium having stored thereon executable program code, which, when executed by a computer system, causes the computer system to perform steps of:
   displaying a first view of a first database table using a current format that is either a first format to display data that is stored in the first database table, or a second format to display metadata that characterize the data that is stored in the first database table;
   displaying a second view of a second database table using a format same as the current format of the first view;
   applying data elements from the first view to the second view;
   changing data in the second database table according to how the data elements from the first view are applied to the second view;
   redisplaying the second view to reflect changes made to the second database table;
   receiving user input; and
   in response to receiving the user input, redisplaying the first view and the second view using a format, either the first format or the second format, that is different from the current format.

17. The non-transitory computer readable storage medium of claim 16 wherein the current format of the first view and the second view is the first format, which displays data that is respectively stored in the first database table and the second database table, wherein redisplaying the first view and the second view includes displaying the first view and the second view using the second format, which represents metadata that characterize the data that is respectively stored in the first database table and the second database table.

18. The non-transitory computer readable storage medium of claim 16 wherein the current format of the first view and the second view is the second format, which displays metadata that characterize data that is respectively stored in the first database table and the second database table, wherein redisplaying the first view and the second view includes displaying the first view and the second view using the first format, which displays data that is respectively stored in the first database table and the second database table.

19. The non-transitory computer readable storage medium of claim 16 wherein the first view and the second view are displayed using the first format.

20. The non-transitory computer readable storage medium of claim 16 wherein the first view and the second view are displayed using the second format.

* * * * *